J. H. ROSE.
SWIVEL TRUCK.
APPLICATION FILED NOV. 25, 1919.
1,346,466.  Patented July 13, 1920.
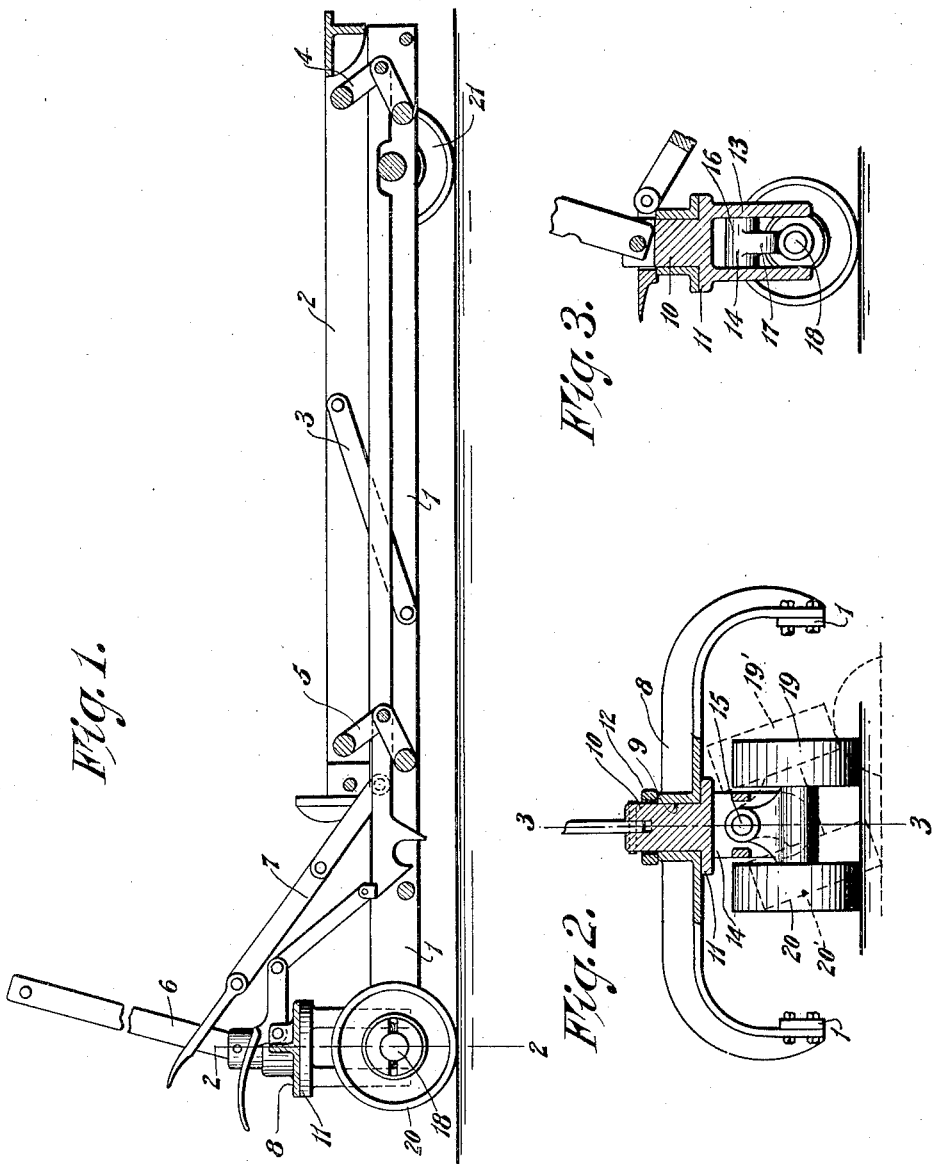
WITNESSES:
INVENTOR,
John H. Rose,
BY Harry W. Bowen
ATTORNEYS.

UNITED STATES PATENT OFFICE.

JOHN H. ROSE, OF HOLYOKE, MASSACHUSETTS.

SWIVEL-TRUCK.

1,346,466. Specification of Letters Patent. Patented July 13, 1920.

Application filed November 25, 1919. Serial No. 340,637.

*To all whom it may concern:*

Be it known that I, JOHN H. ROSE, a citizen of the United States of America, residing at Holyoke, in the county of Hampden and Commonwealth of Massachusetts, have invented certain new and useful Improvements in Swivel-Trucks, of which the following is a specification.

The invention relates to improvements in swivel trucks in which the wheels thereof are designed to move or swing in horizontal and vertical planes. The invention is particularly designed for supporting the forward end of an elevating truck in which a frame is vertically movable toward and away from the main frame. It is important in this class of trucks that the elevating main body of the truck shall be maintained in stable equilibrium at all times, or in other words, that all of the supporting wheels shall at all times rest upon the supporting floor or surface without regard to any unevenness of the floor or other supporting surface.

My present invention is particularly designed to overcome the above objections. The subject matter of the present application is a division in part of my prior United States patent issued Dec. 23, 1919, No. 1,325,863, for an elevating truck in which application the claims are all confined to the elevating features.

A feature of my present invention relates to the construction of the swivel head to which the handle for operating the truck and for elevating purposes is attached. Other objects and features of my invention will be apparent from the following description, and will be particularly pointed out in the claims.

Referring to the drawings:

Figure 1 is a side elevational view of the swivel truck shown located at the forward end of the main frame of an elevating truck, the elevating features, as stated, of which, are described and claimed in my above referred to pending application.

Fig. 2 is a vertical sectional view on the line 2—2 of Fig. 1.

Fig. 3 is a sectional elevational view on the line 3—3 of Fig. 2, clearly showing the swivel block mounted in the swivel truck frame proper.

Referring to the drawings in detail: The elevating features of the truck are indicated by the numerals 1, 2, 3, 4, and 5, and the connecting means between the handle 6 and the frame 2, in general, by the numeral 7. These features have already been described and claimed in the above referred to application.

Referring now to the specific structure of the swivel truck, 8 indicates a yoke member which connects the forward ends of the side portions 1 of the main frame. This yoke member is formed with the vertically arranged opening 9 in its center portion and which receives the spindle or upwardly projecting part 10 of the swivel truck. Located directly below the part 10 and integral therewith is a table or platform 11. The part 10 is retained in place by means of the collar 12. Depending from the portion 11 are the integral parts 13 and 14. Extending transversely of these depending portions is a pin 15. Mounted on this pin is a block 16 clearly shown in Fig. 3. This block turns about the pin 15. Depending and forming a part of the block is a portion 17 in the lower end of which is mounted the shaft 18 that turns freely in the depending portion 17. Secured to the end of the shaft 18 are the wheels 19 and 20.

It will be noticed from this construction that the truck as a whole can rotate in a horizontal plane in the opening 9 of the yoke 8, and that the wheels 19 and 20 can freely rotate transversely of the pin 10 about the pin 15 as shown in Fig. 2 in the dotted lines at 19′ and 20′.

It will also be seen by reason of this construction that the two wheels at the forward end of the truck, or other vehicle, and the two wheels at the rear end as indicated at 21, will permit the whole structure to automatically adapt itself to any unevenness of the floor or other supporting surface and that the vehicle will be maintained substantially in a parallel relation to the supporting surface regardless of any minor unevenness.

What I claim is:

1. In a truck, a main frame having side bars, wheels for supporting the same, a swivel connection between the wheels at the forward end of the truck and the main frame, said swivel having a yoke that is connected to the forward ends of the side bars of the main frame, means for supporting the forward wheels comprising a truck member having parallel arranged and downwardly extending portions, a pin in said portions, a block pivotally supported on said pin and between said portions, said block having an extension thereof, an axle in the extension and at right angles to said pin for attaching and supporting the forward wheel, said truck having an upwardly extending portion for providing a swivel connection with the yoke, whereby the supporting means for the forward end of the truck can freely operate in both a horizontal and vertical plane, and whereby the truck as a whole is always maintained in a position that is substantially parallel with the supporting surface and independent of any great unevenness of said surface, and an operating handle connected to the upwardly extending portion of the swivel connection.

2. In a truck, a main frame having side bars, supporting wheels therefor, the supporting means for the wheels for one end of the main frame being mounted in a yoke member 8 that is connected to the forward ends of the side bars of the main frame, a truck having swivel connection 10 with the yoke member for movement about a vertical axis and for attaching the forward supporting wheels of the truck proper to the main frame, means for permitting the wheels to swing in a horizontal and vertical plane whereby the truck as a whole is always maintained in a position that is substantially parallel with the supporting surface and independent of any unevenness of said surface, and a steering and operating handle connected with the swivel.

3. A truck for supporting the forward end of an elevating truck or the like, comprising, in combination, a frame having a swivel or pivot portion, depending portions, a shaft connecting said portions, a block on the shaft, a shaft in the block and to which the wheels of the truck are secured, whereby the block and wheels can move in planes that are at right angles to each other, and whereby the supporting truck as a whole can revolve about its pivot or swivel portion.

4. In an elevating truck structure, the combination, of means for supporting the forward end of said structure, said means including a wheel supporting truck-structure having an upwardly projecting portion 10 and a platform 11 which serves as a swivel to connect the wheeled truck structure to the elevating structure, said wheeled truck structure also including depending portions 13 and 14, a pin 15 connecting said portions, a block 16 loosely mounted on the pin and having a depending part 17, and axle 18 in said extension part and to which axle the wheels are connected, whereby the wheels of the truck structure can move in both vertical and horizontal planes.

JOHN H. ROSE.